May 17, 1949.　　　N. E. WAHLBERG　　　2,470,274
AUTOMOTIVE TRANSMISSION
Filed July 30, 1942　　　3 Sheets-Sheet 1
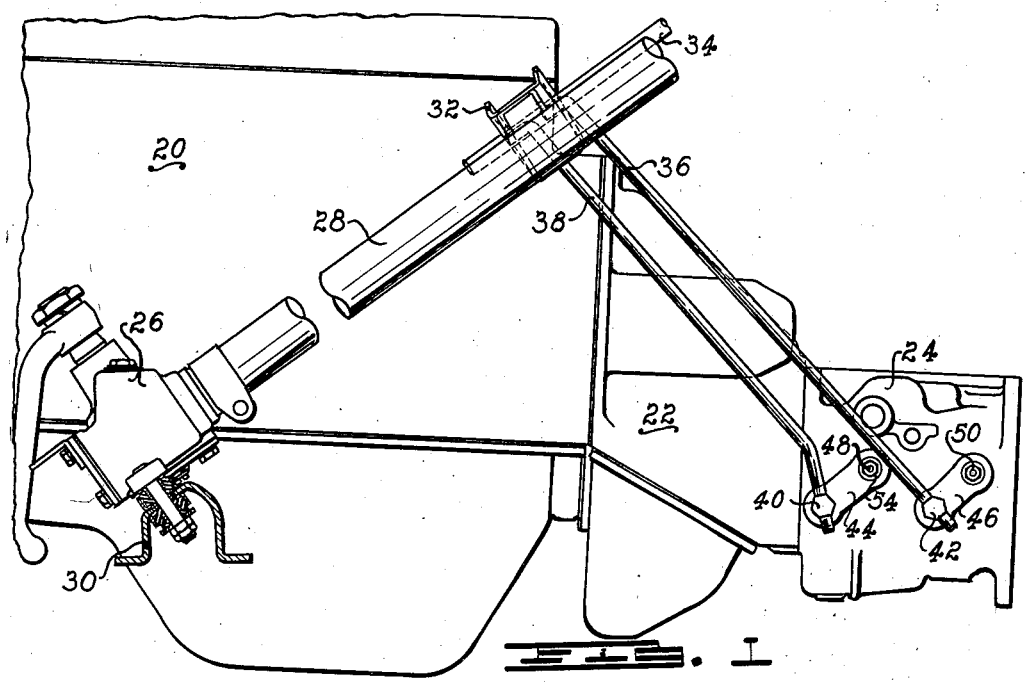
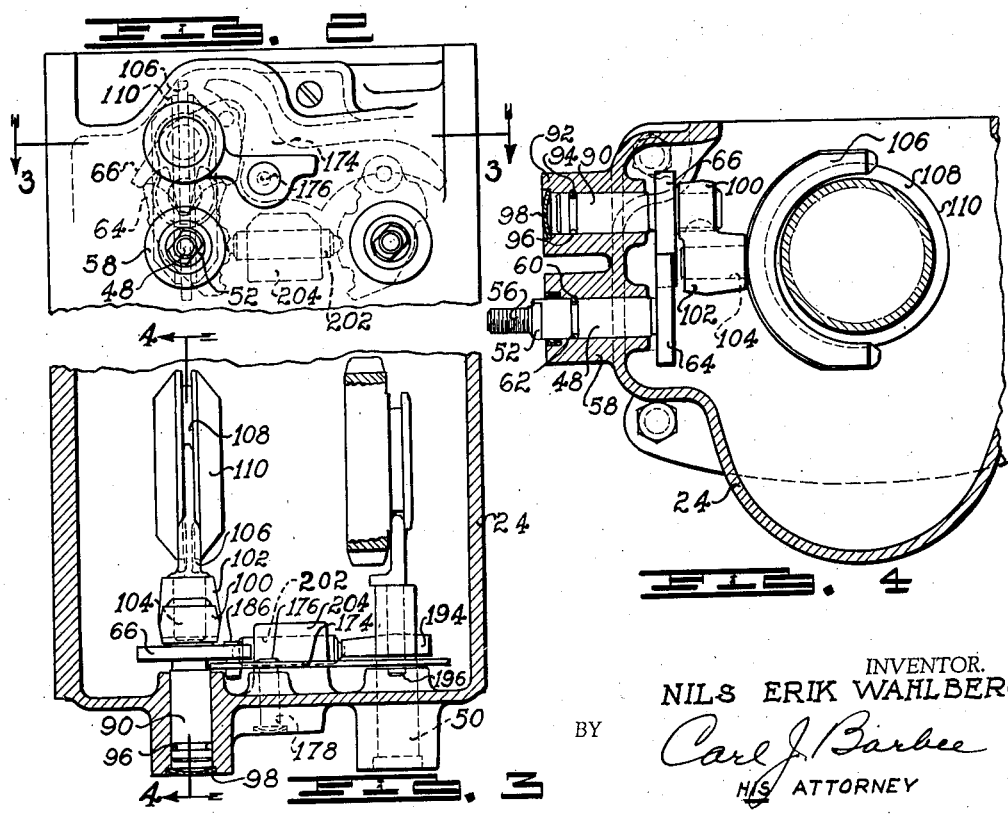
INVENTOR.
NILS ERIK WAHLBERG
BY
HIS ATTORNEY

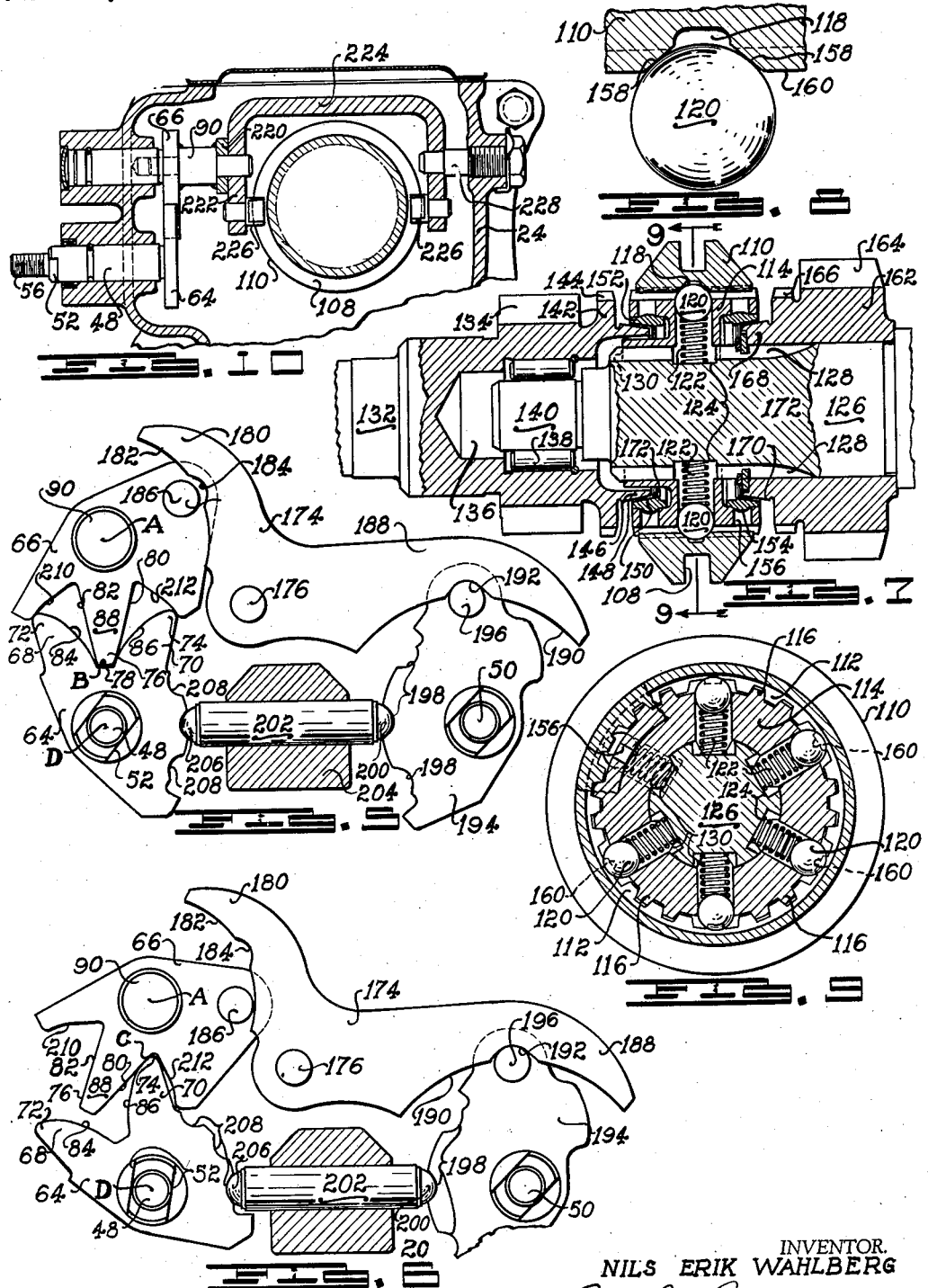

May 17, 1949.    N. E. WAHLBERG    2,470,274
AUTOMOTIVE TRANSMISSION
Filed July 30, 1942    3 Sheets-Sheet 3
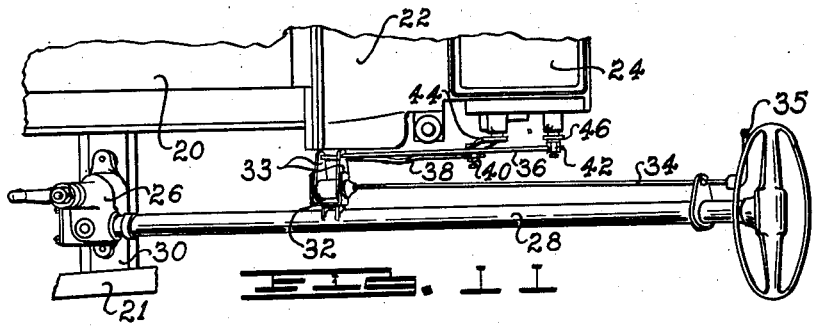
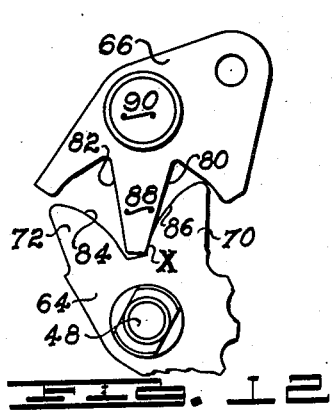
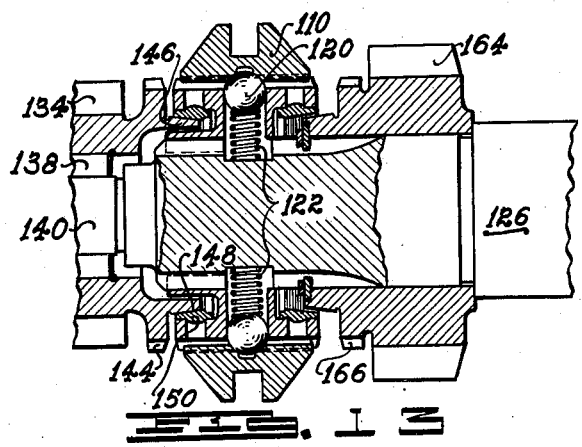
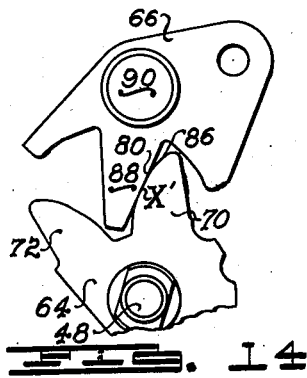
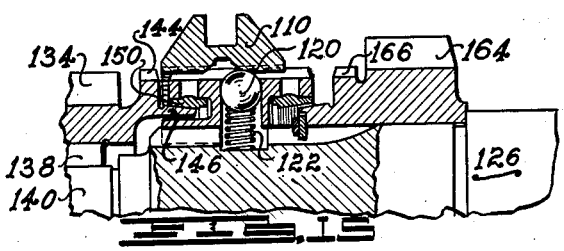
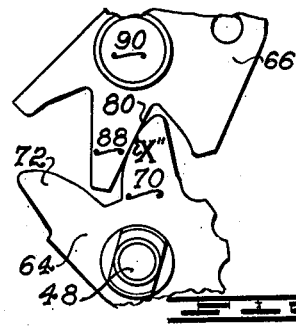
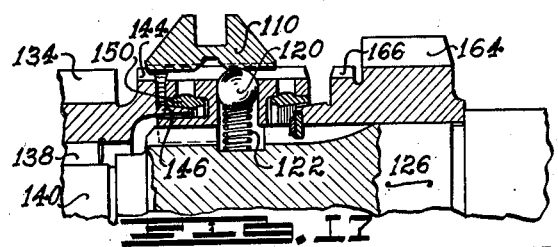
INVENTOR.
NILS ERIK WAHLBERG
BY Carl J. Barbee
HIS ATTORNEY Patented May 17, 1949

2,470,274

UNITED STATES PATENT OFFICE 2,470,274

AUTOMOTIVE TRANSMISSION

Nils Erik Wahlberg, Chicago, Ill., assignor to Nash-Kelvinator Corporation, Kenosha, Wis., a corporation of Maryland Application July 30, 1942, Serial No. 452,861

13 Claims. (Cl. 74—473)

This invention relates to automotive transmissions and more particularly to a speed synchronizer arrangement to facilitate shifting of gears within the transmission.

It is an object of this invention to provide means for synchronizing the speeds of two shafts to be coupled by a clutch, prior to shifting of the clutch positively to lock the two shafts together.

It is a further object of this invention to provide means whereby the manual effort exerted in shifting a positive clutch will be transmitted to a friction brake and will be multiplied or increased in the transmittal thereof for the purpose of increasing the braking effort.

A further object of this invention is to provide means for initially multiplying the manual shifting effort in a transmission of this type and thereafter increasing the speed of shifting, the initial movement being relatively slow due to the multiplication of the effort.

Further objects and advantages will appear hereinafter as the description proceeds and will be more particularly pointed out in connection with the appended claims.

In the drawings, of which there are three sheets:

Figure 1 is a side elevational view of an internal combustion engine, clutch, transmission and steering column assembly;

Figure 2 is a partial elevational view of the transmission shown in Figure 1, parts being removed and parts being shown in dotted lines in position within the transmission;

Figure 3 is a horizontal sectional view through the transmission shown in Figure 1 taken substantially upon a plane as indicated by the line 3—3 of Figure 1;

Figure 4 is a vertical, transverse, sectional view through the transmission shown in Figure 3 and taken substantially upon the plane as indicated by the line 4—4 of Figure 3;

Figure 5 is a detailed elevational view of the shifter means, interlock mechanism and speed finder mechanism shown in dotted lines in Figure 2 and showing the parts in their neutral position;

Figure 6 is a view corresponding to Figure 5 but showing the parts rotated to the position in which the direct drive gear is engaged;

Figure 7 is a detailed, longitudinal, sectional view through the clutch shaft and tail shaft of the transmission and showing the second and high shifter clutch;

Figure 8 is a detailed view of one of the poppets shown in Figure 7;

Figure 9 is a transverse sectional view of the clutch mechanism shown in Figure 7 and taken substantially upon a plane as indicated by the line 9—9 of Figure 7;

Figure 10 is a transverse sectional view corresponding to Figure 4 but showing a modified form of shift yoke;

Figure 11 is a partial plan view of the motor, clutch housing, transmission, steering gear and shifter mechanism of the invention;

Figure 12 is a detailed view of the shifter cams, showing them rotated through a first increment of movement;

Figure 13 is a longitudinal sectional view of the shifter clutch assembly and synchronizer ring, showing the parts in a position corresponding to the cam position shown in Figure 12;

Figure 14 is a view similar to Figure 12, showing the cams in a still further shifted position;

Figure 15 is a view similar to Figure 13 but showing the parts in a position corresponding to the cam position shown in Figure 14;

Figure 16 is a view similar to Figure 14 but showing the cams in a still further shifted position approaching their full throw; and Figure 17 is a view similar to Figure 15 but showing the parts in a position corresponding to the cam position shown in Figure 16.

Referring more in detail to the drawings, in which similar reference characters are employed to designate similar parts, an internal combustion engine 20 which is supported from an automobile frame 21 (Figure 11) in the usual manner, has attached to its rear end a clutch housing 22. At the rear of the clutch housing, there is rigidly attached a transmission housing 24.

A steering gear 26 secured to the lower end of a steering column 28 may be supported upon a frame cross member 30 as is more particularly described in the application of Wallace S. Berry et al., Serial No. 421,440, for Steerable road wheel mounting, filed December 3, 1941, now Patent No. 2,369,644. The steering column 28 supports a U-shaped bracket 32 within which levers 33 are pivoted for selective operation by a gear shifter shaft 34 manually operated from a lever 35 located in the vicinity of the steering wheel. A steering column shift mechanism of the character which may be employed is more fully disclosed in the application of Nils Erik Wahlberg for a Gear shift, Serial No. 335,936, filed May 18, 1940, now Patent No. 2,301,484. Shift rods 36 and 38 are connected to the shift levers supported within the U-shaped bracket 32 and may be selectively operated to be moved either forwardly or rearwardly from the neutral positions shown in Figure 1.

The rearmost ends of the rods 36 and 38 are connected by means of set screws 40 and 42 to shafts swiveled in cranks 44 and 46. Cranks 44 and 46 are fixed upon shafts 48 and 50, respectively. The shaft 48 is arranged to shift the second and direct speed gear clutches while the shaft 50 is arranged to shift the low and reverse gear clutches. Since the present invention is primarily concerned with the synchronizing of the second and direct speed gear clutches, the description will be confined to this portion of the transmission.

The shaft 48 may be flattened as at 52 as shown in Figures 2, 4, 5 and 6 and the crank 44 may be provided with a pierced aperture for mating therewith so as rigidly to connect the crank 44 to the shaft 48 by means of a nut 54 (Figure 1) threaded onto the projecting threaded end 56 of shaft 48. Shaft 48 may be secured against axial movement within the boss 58 of the transmission case 24 by means of a pin 60 having a drive fit in an aperture in boss 58 and engaged in groove 62. Pin 60 may have a loose fit within the groove 62. The end of the shaft 48 projecting into the transmission case 24 may have secured to it a cam generally indicated by the reference character 64. In this regard, attention is directed to Figures 5 and 6 which contain an enlarged showing of the cam 64.

Cam 64 is the driving cam of a set of two including a driven cam 66. Driving cam 64 is made up of two lobes 68 and 70 which have their tip portions 72 and 74 spaced apart widely but which are spaced apart at their root portions only by a width slightly greater than the width of the tip portion 76 of the driven cam 66. In the neutral position as shown in Figure 5, the tip portion 76 of the driven cam rests within the gap 78 between the roots of the lobes 68 and 70 of the driving cam 64. The edge or operating surfaces 80 and 82 of the driven cam are, however, arranged in a single plane for contact seriatim with the curved driving edges 84 and 86 of the lobes 68 and 70. The curves 84 and 86 are so generated that the root portion of the lobe which may be acting upon the driven tooth 88 of cam 66 remains in contact with the tip portion of tooth 88 over a substantial proportion of the movement of the cam 64. During the remainder of the movement of the cams, the curved surface of the driving cam lobe travels along the straight edged portion of the tooth 88 into engagement with the root section thereof and at the end of its travel, assumes a position such as is shown in Figure 6.

It will be understood that during this motion from neutral to fully displaced position as shown in Figure 6, the length of the lever arm acting to rotate the cam 66 about its shaft 90 changes from the length AB (Figure 5) to the length AC (Figure 6) and in the same operation the length of the driving lever arm changes from the length DB (Figure 5) to the length DC (Figure 6). As shown in these particular figures, in which the scale is approximately full size, the length AB is equal to approximately one and one-eighth inches and the length AC is equal to approximately one-half an inch. On the other hand, the length DB is equal to approximately one-half an inch and the length DC equals approximately one and one-eighth inches.

Accordingly, it is a relatively simple matter to discover that in moving from neutral position to the fully displaced position, the driving cam operates first with a mechanical advantage over the driven cam in a ratio of approximately 2.25 to 1, and toward the end of its travel with an advantage with respect to the driven cam in a ratio of approximately .44 to 1. Accordingly the initial movement of the driven cam 66 will occur with approximately 44% of the speed with which the driving cam 64 is moved and, due to the lever ratios and the fact that they are altering during movement, the final movement of the driven cam 66 will occur at a speed approximately 225% of the speed of the driving cam 64.

Since the cam surfaces 84 and 86 are similar, a similar motion takes places in either direction of movement of the cam surfaces away from neutral position.

The driven cam shaft 90 is supported within a boss 92 in which it is prevented from moving axially by means of a pin 94 extending into a groove 96 therein. The end of the shaft and its bearing within the boss 92 may be protected by means of a plug 98 against the entrance of dirt or other foreign matter.

The end of the shaft 90 which projects into the transmission case, in addition to having the cam 66 secured thereto, is provided with a crank arm 100 (Figure 4) attached thereto as by welding. The crank arm 100 has a free end terminating in a boss 102 which is apertured rotatably to receive a stub shaft 104 integral with a shift fork 106 received within a groove 108 of a clutch collar 110.

Referring more particularly to Figures 7, 8 and 9, the clutch collar 110 will be recognized as being provided with a series of internal teeth 112 adapted to be slidably received upon a clutch hub 114 provided with mating teeth 116. The internal teeth 112 of the collar 110 may be removed or omitted at spaced intervals around the internal periphery of the collar 110 to provide pockets 118 in which poppets 120 comprising hardened steel balls are receivable. The poppets 120 are urged outwardly into engagement with the pockets 118 by means of springs 122. As illustrated, the clutch hub and clutch collar contain six such poppets 120 equally spaced around the periphery of the clutch hub.

The springs 122 are seated at their inner ends upon circular lands 124 which are cut radially into the transmission tail shaft 126, such tail shaft being provided with splines 128 engaged with internal teeth 130 upon the clutch hub 114. The engine clutch shaft shown at 132 in Figure 7 may be supported from the transmission case 24 by means of any suitable bearings and extends into the transmission case to provide a head gear 134 internally recessed as at 136 in the usual manner and provided with roller bearings 138 to provide a pilot bearing for the forward end 140 of the transmission tail shaft. The rear end of the engine clutch shaft 132 is also provided with a peripherally toothed flange 142 having teeth 144 for engagement with the internal teeth 112 of the clutch collar 110. The engine clutch shaft 132 is also provided with an axially extending flange 146 which provides an external conical surface 148 adapted to mate with an internal conical surface 150 provided upon an annular ring 152 which may be swaged or otherwise deformed at 154 into a series of depressions 156 formed in the clutch hub 114.

The annular ring 152 may be made of brass or other friction material for the purpose of engaging the conical surface 148 of the annular flange 146. It will be understood that movement of the clutch hub 114 to the left as viewed in Figure 7 will also move the annular ring 152 which forms a shoe and engages the conical surface 148. This movement of the clutch hub 114 is accomplished through the poppets 120. The engagement of the poppet balls 120 with the angularly arranged sides 158 of the depressions 118 under the stress of the springs 122 will prevent radial retracting motion of the poppet balls 120 until the thrust upon the clutch collar 110 and the opposing reaction upon the clutch hub 114 exceed a predetermined minimum.

At the time that this minimum is exceeded, the poppet portion 120 will be radially displaced by the angularly arranged surfaces 158, permitting the remainder of the tooth 160 which is not cut away to ride up thereon, thereby permitting the clutch collar 110 to be shifted with its internal teeth 112 in engagement with the teeth 144 formed upon the clutch element 142 of the engine clutch shaft 132. It will be understood that considerable pressure must necessarily be exerted upon the clutch collar 110 in order so to depress the poppets 120 and that the entire reaction to this pressure must be developed between the friction clutching surfaces 148 and 150. Consequently, the friction clutching surfaces, each being fixed upon one of the two elements to be connected, will cause a braking of the speed of movement of the shaft rotating with the greatest velocity so that the two shafts will approach synchronism with one another and will facilitate the completion of the positive clutching engagement as they are brought into synchrony.

Also shown in Figure 7 is the second speed gear 162 provided with teeth 164 which may be driven in the usual manner from a second speed gear of a countershaft gear cluster (not shown) arranged upon a countershaft (not shown). The gear 162 is provided with a second set of teeth 166 for engagement with the internal teeth 112 of the clutch collar 110. Also provided on the gear 162 is an axially extending hub portion 168 which is provided with an external conical friction clutching surface 170 for engagement with the mating internal conical surface 150 of a similar friction shoe 152 also supported rigidly upon the clutch hub 114.

It will be noted that a slight clearance 172 exists between the friction surfaces on both sides of the clutch hub 114. Consequently, the initial movement of the clutch hub 114 will take up this clearance prior to engagement of the friction clutching surfaces 148 and 150. This is necessary in order that the friction surfaces may run free of one another when the parts are in their neutral position.

A more complete understanding of the action between the cams 64 and 66 may be had from a study of Figures 12 through 17 in which various intermediate positions of the cams are shown, together with the corresponding movement of the clutch collar and friction clutching surfaces 148 and 150. In Figures 12 and 13 the cams and the clutch collar 110 are shown as being shifted away from neutral position and in a direction ultimately to engage the direct drive gear. It will be noted that this initial movement of the cams and shifting collars acts first to take up the clearance 172 which existed between the friction clutching surfaces 148 and 150 while the mechanism was in the neutral position. This elimination of clearance results in the friction surfaces being brought lightly together while the root portion of the surface 86 forming lobe 70 is still in contact close to the tip portion of the straight surface 80 of the lobe 88 on cam 66. The point of engagement between the surfaces 80 and 86 has been designated X, and it will be noted that the lever advantage is still very much in favor of the driving cam so as to permit the exertion of considerable force upon the cam 66 and consequently upon the poppets 120 to force the friction surfaces 148 and 150 together to bring the shafts by which they are carried into synchronism, all with the exertion of a relatively light expenditure of force upon the shift lever. The synchronizing stage of the shift occurs between the positions of the cams and shift ring shown in Figures 12 and 13 and in Figures 14 and 15.

Figures 14 and 15 illustrate the device with the poppets 120 depressed against the action of their springs 122 and show the clutch collar 110 in a position in which it is about to engage the external teeth 144 formed as a part of the end of the main clutch shaft 132. In this position of the mechanism, it will be noted that the surface 86 of the cam lobe 70 is in contact with the straight surface 80 of the cam lobe 88 at about their midpoints and any further movement of the cams relative to one another will cause the tip of the lobe 70 to engage with the root of the lobe 88 in a very rapid manner. The point of engagement of the two surfaces is designated X' in Figure 14.

In Figures 16 and 17 the cams in the clutch collar are shown in the position in which the clutch collar has engaged with its internal teeth 112 the external teeth 144 although the shifting movement has not been entirely completed as these teeth are not in full engagement as shown in these figures.

The final movement of the cam occurs between the positions illustrated in Figures 16 and 17 and in Figure 6, in which latter figure the point of engagement C of the surfaces 80 and 86 is shown as occurring between the root and tip respectively of these lobe surfaces.

The purposes of altering the lever ratios during shifting are first to secure an advantage in favor of the operation during the time that the friction clutching surfaces 148 and 150 are performing the work of synchronizing the shafts and while the poppets 120 are being depressed, and second, rapidly to complete the shifting of the positive clutching elements into engagement while the shafts remain in synchrony and before they have an opportunity to depart from synchrony.

Turning for the moment to Figures 5 and 6, attention is directed to the interlock mechanism there shown. The interlock comprises a lever 174 pivoted at 176 at its midpoint upon a shaft 178 (see Figure 3) supported in the transmission case 24. The lever 174 is provided with an end portion 180 which has its underside formed in a smooth curve 182 which is concentric with the shaft 90 when the lever 174 is in a neutral position. The curve 182 is interrupted intermediate its length by a semi-circular depression 184 adapted to receive a stub shaft 186 when the lever 174 is rotated in a counter-clockwise direction as viewed in Figures 5 and 6. The curve 182 will pass through the approximate center of the stub shaft 186 when the lever 174 is rotated counter-clockwise, with the depression 184 engaged with the stub shaft 186. The opposite end 188 of the lever 174 is provided with a similar curved under surface 190 also interrupted by a semi-circular depression 192.

The low and reverse shifter shaft 50 has secured thereto a speed selector plate 194 which carries a stub shaft 196 for engagement with the semi-circular depression 192. When one or the other of the selector plate 194 or the driven cam 66 is rotated from its neutral position to select the reverse or one of the forward speed gear trains, either of the stub shafts 186 or 196 will ride up upon the respective curved under surface 182 or 190 of the lever 174 and will rotate the lever from its neutral position and engage the semi-circular depression 184 or 192 with the stub shaft 186 or shaft 196, respectively, to prevent rotation of either the shaft 50 or 90 with which such stub shaft is operatively associated.

In Figure 6 the mechanism is illustrated with the stub shaft 186 rotated out of its neutral position by rotation of the cam 66 in a clockwise direction from neutral position. This causes rotation of the lever 174 in a clockwise direction and causes engagement of the notch 192 with the stub shaft 196. Such engagement prevents rotation of the selector plate 194 and consequently locks shaft 50 in the position shown in Figure 6 until such a time as the cam 66 is returned to neutral position to permit the counter-clockwise rotation of the lever 174 to free the stub shaft 196 from its engagement with the depression 192.

The cam plate 194 is provided with a series of three spaced arcuate depressions 198. These depressions 198 serve to indicate to the operator the shifted position of the gear or clutch which is being shifted by the low and reverse shift shaft 50 and is accomplished by means of a ball 200 spring pressed outwardly against the edge of the selector plate 194. In the central position as shown, the selector plate is in the neutral notch 198.

The ball 200 is carried in a sleeve 202 which may be secured within a boss 204 of the transmission case. The opposite end of the sleeve 202 carries a ball 206 for engagement with notches 208 formed in the driving cam 64. The cam plate 64 is shown with the ball 206 engaged with the lowermost or direct drive speed selector notch 208.

The driven cam 66 is also provided with a pair of wings 210 and 212, such wings being shaped to follow quite closely the respective ends of lobes 72 and 74 of the driving cam 64 during its motion away from neutral or dead center position. The surfaces 210 and 212 are so arranged as to provide for return of the driven cam 66 to its neutral position because, with the considerable change in lever ratios in moving from neutral to gear selected position, it would be difficult, if not impossible, to assure return of the cams to their neutral position in every instance when the shifting from gear engaged to neutral position is desired. In other words, these cams are apt to be somewhat overcentering and to have an efficiency which is less than 50% in the return direction. It will be appreciated that upon the return movement, the tip of the cam lobe 70 will accomplish most of the driving movement between cam 64 and cam 66 but that when neutral position is reached, the cam lobe 74 is about to pass out of engagement with the curved surface 212 on the cam 66. Attention is particularly directed to Figure 6 in which the cam lobe 68 is shown completely out of engagement with the curved surface 210 with which it will engage for return of the mechanism from the second gear selected position to neutral.

A modified form of shift yoke is shown in Figure 10. In this figure the cam supporting shaft 90 has welded thereto the plates 220 and 222. The plate 222 comprises one arm of a U-shaped shift yoke 224 which spans the clutch collar 110 so that shoes 226 carried upon opposite diametrical portions of the clutch collar and within the groove 108 may exert an equal force upon opposite diametrically spaced portions of the clutch collar. The shoes 226 are pivotally carried in the arms of the yoke 224. The yoke may be supported upon a stub shaft 228 arranged axially in alignment with the shaft 90 and secured in the wall of the transmission case 24. This arrangement assures equal distribution of the shifting force on opposite sides of the clutch collar diameter and prevents cocking or jamming of the collar in shifting. In all other respects, the operation of the mechanism shown in Figure 10 is the same as that disclosed in Figures 1 to 9.

While the invention has been described in considerable detail, the description is not to be taken as limiting the invention. All equivalents falling within the scope of the appended claims are expressly reserved.

I claim:

1. A shift mechanism for transmissions comprising a rock shaft, a shifting fork carried by said rock shaft, a second rock shaft, manually operable means for rotating said second rock shaft, and variable advantage interengaging toothed means each comprising a plurality of tooth elements between said rock shafts and fast to each of said rock shafts and each tooth extending from one rock shaft toward the other more than two-thirds of the distance between said rock shafts for multiplying the shifting force imparted by said second rock shaft to said first rock shaft.

2. A shift mechanism for power transmissions comprising a first rock shaft, a shifter fork mounted on said first rock shaft and movable thereby, a second rock shaft, a manually movable shift lever having one end fast to said second rock shaft, a plate having a single tooth with a pair of cam surfaces on either side thereof secured to said first rock shaft, and another plate having a pair of teeth secured to said second rock shaft, said pair of teeth embracing said single tooth and each being contoured to engage the single tooth at its tip when the shift mechanism is in neutral and to progressively move its point of engagement toward the root of the single tooth when the mechanism is shifted and to engage the cam surfaces when the shift mechanism is shifted back to neutral position.

3. A motion transmitting device comprising a driving shaft, a driven shaft parallel to said driving shaft, a cam plate mounted on said driven shaft and having a single tooth projecting toward said driving shaft cam surfaces formed on said cam plate on either side of said tooth, and a cam plate mounted on said driving shaft and having a pair of teeth projecting toward said driven shaft and embracing said driven cam tooth and adapted to engage said cam surfaces, said driving cam teeth each being curved intermediate its length and said driven cam tooth being substantially straight in profile so that said cam teeth engage one another progressively from the root of the curved tooth and tip of the straight tooth to the tip of the curved tooth and root of the straight tooth to alter the mechanical advantage between the cams from an advantage which favors the driving cam to an advantage which favors the driven cam.

4. A motion transmitting device comprising a driving element and a driven element, means for manually moving said driving element, and interengaging toothed means between said driving and driven elements, said toothed means including a driving cam having its operative surface curved throughout its length, and a driven cam having a central portion of its surface formed as a plane operative surface, said cam surfaces forming faces of teeth and adapted to engage one another alternately at the tip and root respectively at each limit of travel and the intermediate surfaces contacting one another sequentially during travel of the cams from one limit of movement to another limit of movement.

5. A motion transmitting device comprising a driving cam having an operating surface, a driven cam having an operating surface, and means for imparting motion to said driving cam, said driving cam surface being curved in at least a portion of its length convexly with respect to said driven cam operating surface, the operating surfaces of said driving and driven cam being in contact at one limit of their operative movement with the outermost part of the driven cam surface upon the innermost part of the driving cam surface, said cams rolling along one another during motion to their other limit of movement to a position in which the outermost part of the driving cam surface contacts the innermost part of the driven cam surface.

6. Motion transmitting mechanism comprising a driving shaft, means for rotating said driving shaft, a driven shaft arranged parallel to said driving shaft, a driven cam on said driven shaft and provided with a tooth having a length greater than the distance of the root of said tooth from the axis of said driven shaft, said tooth having a tip extending a distance more than two-thirds of the distance between said shafts, and a driving cam on said driving shaft and provided with spaced teeth embracing said driven cam tooth and each having a length greater than the distance of the roots of said driving cam teeth from the axis of the driving shaft, said driving cam teeth each having a tip extending a distance more than two-thirds of the distance between said driven and driving shafts.

7. Motion transmitting mechanism comprising a driving shaft, means for rotating said driving shaft, a driven shaft arranged parallel to said driving shaft, a driven cam on said driven shaft and provided with a tooth having a length greater than the distance of the root of said tooth from the axis of said driven shaft, said tooth having a tip extending a distance more than two-thirds of the distance between said shafts, and return wings on said driven cam engageable by said driving cam teeth.

8. Motion transmitting mechanism comprising a driving shaft, means for rotating said driving shaft, a driven shaft arranged parallel to said driving shaft, a driven cam on said driven shaft and provided with a tooth having a length greater than the distance of the root of said tooth from the axis of said driven shaft, said tooth having a tip extending a distance more than two-thirds of the distance between said shafts, and a driving cam on said driving shaft and provided with spaced teeth embracing said driven cam tooth and each having a length greater than the distance of the roots of said driving cam teeth from the axis of the driving shaft, said driving cam teeth each having a tip extending a distance more than two-thirds of the distance between said driven and driving shafts, said driving cam teeth each being curved on the face engaging said driven cam and the faces of said driven cam tooth engaged by said driving cam teeth each being arranged in a single plane.

9. A transmission shift mechanism comprising a gear selector element shiftable from neutral to gear engaged positions, a manually movable lever, a driving rock shaft mounting said lever, a driven rock shaft arranged parallel to the driving rock shaft, means mounted on said driven rock shaft for shifting said gear selector element, and motion transmitting means between said rock shafts including toothed interengaging cams, one mounted on each rock shaft, said cams functioning to multiply the manual effort applied to said lever at the beginning of movement of said selector element to gear selected position and to multiply the speed of movement of the selector element above the manual speed applied to said lever toward the completion of movement of said selector element to gear selected position.

10. A shift mechanism for a power transmission comprising a transmission housing, a driven rock shaft mounted in said housing, a shift element supported from said rock shaft and shiftable from a neutral to a gear engaged position, a driven cam on said rock shaft, a driving rock shaft mounted in said housing, and a driving cam on said driving rock shaft and engaging said driven cam, said driving and driven cams having a configuration to engage one another more closely adjacent said driving rock shaft than said driven shaft when said shift element is in neutral position and more closely adjacent said driven shaft than said driving shaft when the shift element approaches gear engaged position.

11. A transmission shift mechanism comprising a manually rotatable rock shaft, a two-lobe cam carried by said rock shaft, a second rock shaft arranged parallel to said manually rotatable rock shaft, a three-lobe cam on said second rock shaft, the central lobe thereof having straight converging sides and the lobes adjacent to the central lobe having irregular sides, the lobes of said first rock shaft cam embracing the central lobe of the three-lobe cam and adapted to engage said irregular sides, and means carried by said second rock shaft and shiftable thereby for selecting a gear train.

12. Motion transmitting mechanism comprising a driving rock shaft, a two-lobe cam carried by said rock shaft, a driven rock shaft arranged parallel to said driving rock shaft, and a three-lobe cam on said driven rock shaft, the central lobe thereof having straight converging sides and the lobes adjacent to the central lobe having irregular sides, the lobes of the two-lobe cam embracing the central lobe of the three-lobe cam and in operative engagement therewith and adapted to engage the irregular sides of the three-lobe cam.

13. A transmission mechanism comprising a driving rock shaft, a two-lobe cam carried by said rock shaft, a driven rock shaft arranged parallel to said driving rock shaft, and a three-lobe cam on said driven rock shaft, the central lobe thereof having straight converging sides and the lobes adjacent to the central lobe having sides curved from their roots away from the central lobe, the lobes of the two-lobe cam embracing the central lobe of the three-lobe cam and in operative engagement therewith and adapted to selectively engage the outer lobes of said three-lobe cam.

NILS ERIK WAHLBERG.

REFERENCES CITED

The following references are of record in the file of this patent:

UNITED STATES PATENTS

| Number | Name | Date |
|---|---|---|
| 309,125 | Best | Dec. 9, 1884 |
| 948,583 | Barnes | Feb. 8, 1910 |
| 1,170,830 | Le Blond et al. | Feb. 8, 1916 |
| 1,371,376 | Jessen | Mar. 15, 1921 |
| 1,425,144 | Schmick | Aug. 8, 1922 |
| 1,835,952 | Kieser | Dec. 8, 1931 |
| 2,003,794 | Van Degrift | June 4, 1935 |
| 2,039,407 | Grohn | May 5, 1936 |
| 2,159,225 | Phelps et al. | May 23, 1939 |
| 2,177,964 | Thompson | Oct. 31, 1939 |
| 2,193,672 | Dolza | Mar. 12, 1940 |
| 2,221,199 | Peo et al. | Nov. 12, 1940 |
| 2,318,286 | Brey et al. | May 4, 1943 |
| 2,366,655 | Russey | Jan. 2, 1945 |

FOREIGN PATENTS

| Number | Country | Date |
|---|---|---|
| 459,396 | France | Sept. 4, 1913 |
| 23,426 | Great Britain | 1907 |